March 29, 1938. W. E. BACK 2,112,755
AIRCRAFT
Filed May 29, 1936 2 Sheets-Sheet 1
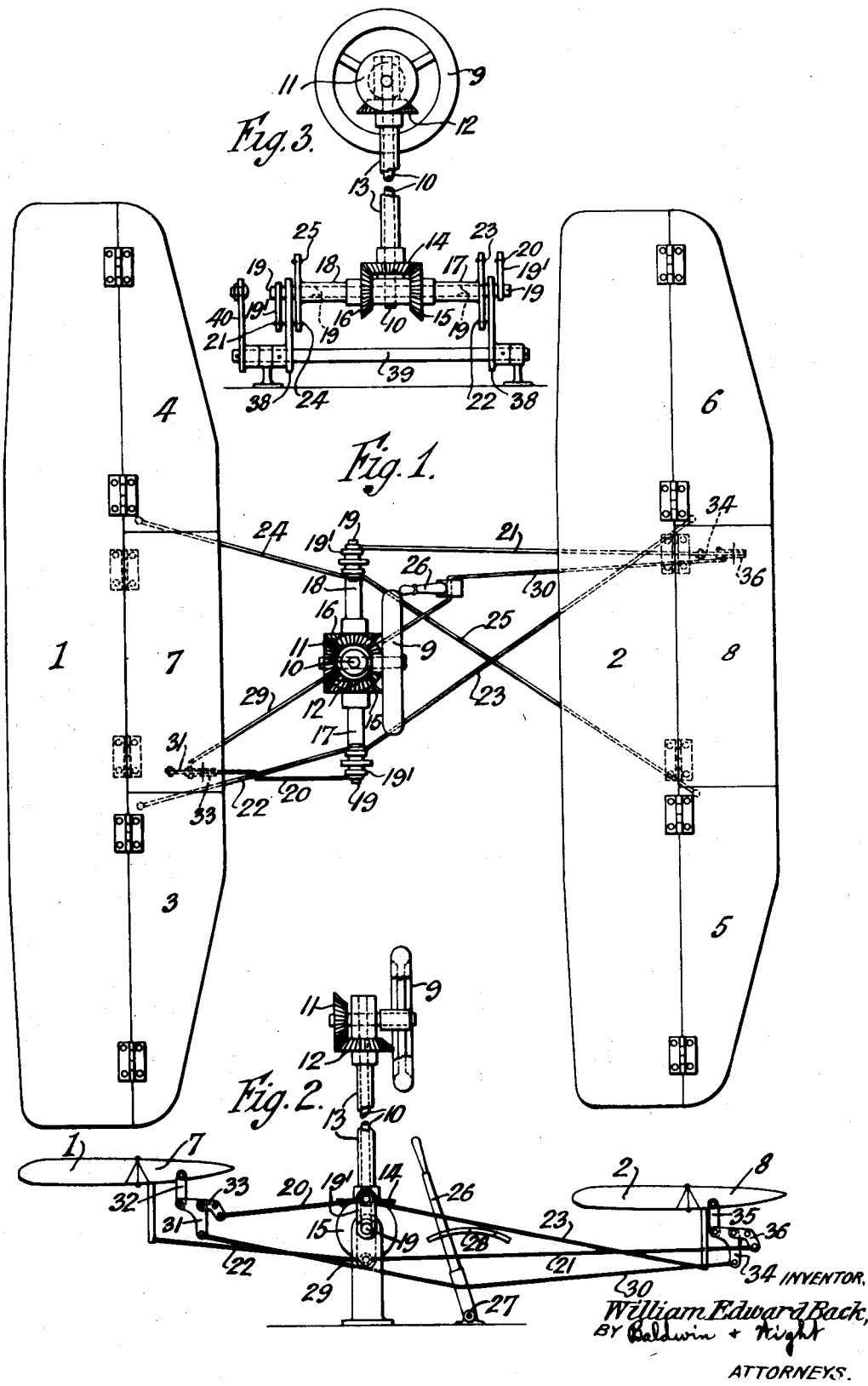

March 29, 1938.                 W. E. BACK                    2,112,755
                                 AIRCRAFT
                            Filed May 29, 1936           2 Sheets-Sheet 2
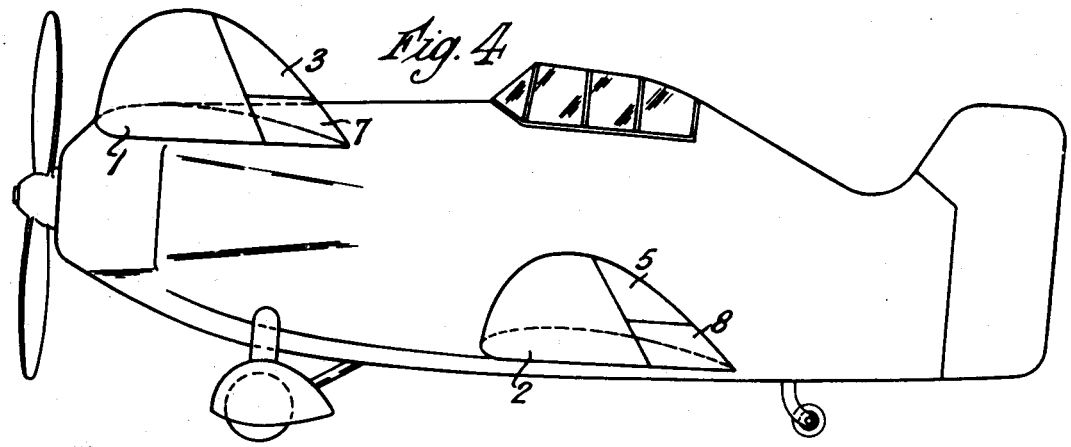
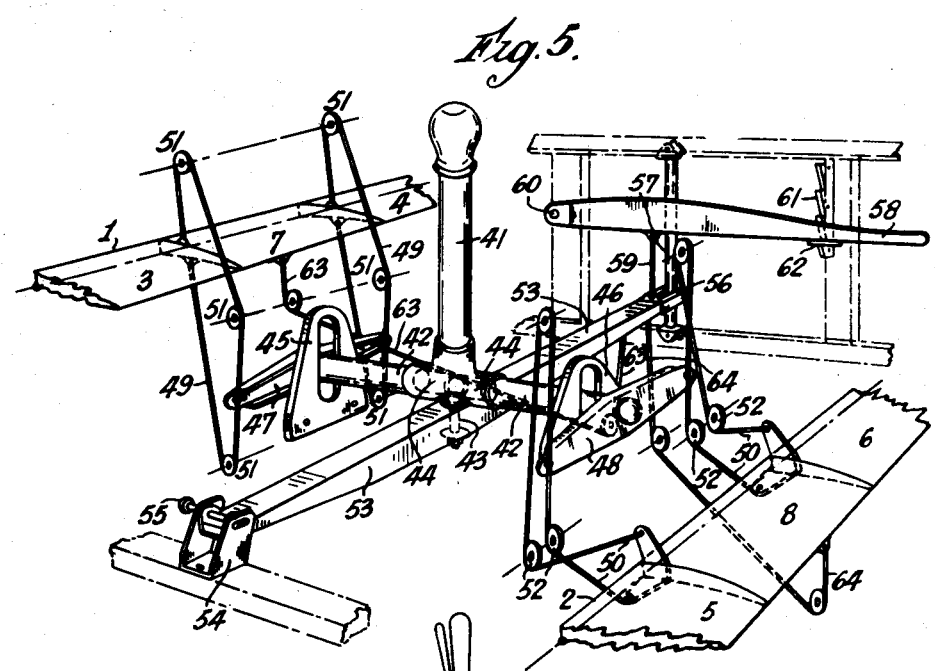
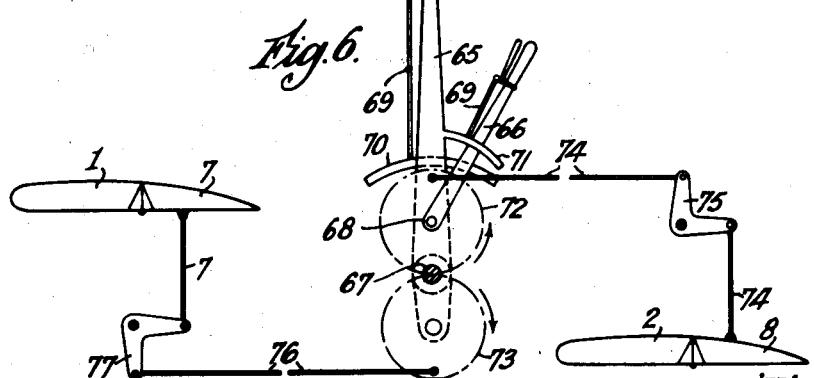

Patented Mar. 29, 1938

2,112,755

UNITED STATES PATENT OFFICE 2,112,755

AIRCRAFT

William Edward Back, Oulton Broad, Suffolk,
England

Application May 29, 1936, Serial No. 82,675
In Great Britain June 7, 1935

13 Claims. (Cl. 244—83)

This invention relates to aircraft construction and control and is concerned with heavier than air craft such as aeroplanes, flying boats and the like.

According to the present invention the aircraft is provided with two main supporting surfaces hereinafter referred to in the specification and claims as wings which are disposed in staggered relationship fore and aft of the normal centre of gravity whilst common means is provided for the operation of the lateral balance control flaps or ailerons which as well as controlling lateral balance serve the double purpose of elevators for controlling longitudinal balance of the machine. With such an arrangement it will be seen that it is possible to dispense with the normally employed orthodox combined tail plane and elevator.

Preferably the wings are provided, in addition to the ailerons, with central hinged wing flaps, constituting, at the trailing edge of each wing, some considerable part of the wing surface, which flaps are capable of movement to impart, by their increased angle of resistance to the wind, an air braking effect to the machine. Preferably means are provided for moving the central hinged wing flaps to different degrees so that they may either act as air brakes or as means for imparting a cambered under surface to the wings to increase or decrease the lifting efficiency thereof.

The means for actuating the ailerons may comprise a pilot's hand control wheel which is free to rotate within or about a vertical control column or lever the arrangement being such that rotation of the hand wheel actuates the ailerons to control lateral balance whilst rocking of the control column or lever in a fore and aft direction controls longitudinal balance.

In an alternative form the longitudinal and lateral control of the machine is obtained through actuation of the ailerons on both fore and aft wings by means of a lever which is universally mounted on a shaft so that fore and aft movement of the lever controls longitudinal balance and sideways movement of the lever controls lateral balance.

The central hinged wing flaps may be so arranged as to be capable of simultaneous movement with the ailerons as a contributing means for maintaining longitudinal balance and also for effecting air brakes.

Various forms of construction are illustrated diagrammatically in the accompanying drawings in which Figure 1 is a plan view of one form of control of the ailerons and wing flaps, Figure 2 a side elevation thereof, and Figure 3 a front elevation but including a modified form of control. Figure 4 is a side view of an aeroplane showing the disposition of the wings, whilst Figures 5 and 6 are further modified forms of control, Figure 5 being a diagrammatic perspective view and Figure 6 a side elevation of one form of wing flap control for effecting air braking and increase or decrease of camber of said wing flaps.

Referring to the construction shown in Figures 1 and 2, 1 represents the fore main wing and 2 the aft main wing, 3 and 4 being respectively the left and right fore ailerons and 5 and 6 the left and right aft ailerons. 7 represents the fore central hinged wing flap and 8 the aft central hinged wing flap. The mechanism for actuating the fore and aft ailerons and wing flaps, for controlling both longitudinal and lateral balance, comprises a pilot's control hand wheel 9 which is free to rotate about the normally provided vertical control column or lever 10 and which carries a suitably toothed bevel wheel 11 which engages with a similar bevel wheel 12 fast on the top end of a hollow shaft or sleeve 13 which surrounds practically the entire length of the vertical control column 10, but which is free to rotate thereabout. The bottom end of said sleeve 13 carries a similar bevel wheel 14 meshing with two other bevel wheels 15, 16 positioned one on each side thereof and at the lower end of the vertical control column 10. The said bevel wheels 15, 16 are fast on hollow sleeves 17, 18 respectively, which sleeves encase and are free to rotate about a transverse shaft 19. The lower end of this column 10 is firmly fixed by a reinforcing socket fitting to the aforementioned transverse shaft (about its mid length) which latter is provided with suitable bearings at or near its ends for positioning the control mechanism relative to the machine's structure and permitting a rotating movement to such transverse shaft by the forward and rearward rocking movement of the vertical control column to control longitudinal balance.

The transverse shaft 19 carries at its ends by means of arms 19', two link rods 20, 21 the rod 20 being hingedly connected to the undersurface of the fore wing flap 7 and the rod 21 being similarly connected to the rear wing flap 8, such link rods 20, 21 transmitting the desired movement to the central fore and aft hinged wing flaps 7 and 8 from movement of the vertical control column 10. This movement, which is a fore and aft rocking of the said column and independent of the movement of the hand wheel 9 for controlling the ailerons 3, 4, 5, and 6, contributes to the control of longitudinal balance of the machine. The longitudinal balance is also controlled by operation of the ailerons 3, 4, 5, and 6 through the following mechanism. The sleeve 17 carries at its end remote from the bevel wheel 15 two link rods 22, 23, the rod 22 passing to a hinged connection on the undersurface of the aileron 3 and the rod 23 to a similar connection on the aileron 6, that is to say the sleeve 17 is in connection with the left side fore aileron and right side aft aileron. The sleeve 18 is similarly provided with two link rods 24, 25, which are respectively hingedly connected to the undersurface of the ailerons 4 and 5, i. e. to the right side fore and left side aft ailerons.

The link rods 22, 23, 24, and 25 transmit movement of the hand wheel 9 to the ailerons for the dual purpose of effecting the lateral balance of the machine during flight and of contributing to or entirely controlling as described below the longitudinal balance of the machine. It will be observed that if through any unforeseen circumstances the hinged wing flaps 7 and 8 become out of control, the ailerons can wholly control the longitudinal balance of the machine as well as the lateral balance. If, however, the ailerons become out of control, the wing flaps 7 and 8 can control the longitudinal balance of the machine.

In order that lateral balance may be maintained imagine that the machine is canting or turning to the left side; to re-establish lateral balance the ailerons 3 and 5 should be depressed and the ailerons 4 and 6 raised thereby imparting to the machine greater lifting power on the left side. In order to effect this, the hand wheel 9 is rotated in a clockwise direction and through the bevel wheels 11, 12, 14, and 15 rotates the sleeve 17 thereby pushing on the link rod 22 and pulling on the rod 23 to pull down the aileron 3 and raise the aileron 6. The sleeve 18 is simultaneously rotated (through the bevel wheels 11, 12, 14, and 16) to pull both the link rods 24, 25 whereby the aileron 4 is raised and the aileron 5 depressed thereby restoring lateral balance of the machine. Reverse rotation of the wheel 9 will effect reverse movement of the fore and aft ailerons.

If now it be desired to trim the machine longitudinally, then the fore and aft ailerons and the fore and aft wing flaps are simultaneously operated. This is effected by a rocking movement of the vertical control column 10 about the axis of the shaft 19. If, for example, it is desired to raise the nose of the machine, the control column 10 is pulled rearwardly. This movement causes a rotation to be imparted both to the transverse shaft 19 and the sleeves 17 and 18 so that all the link rods 20, 21, 22, 23, 24, and 25 are moved. The link rod 20 is pulled rearwardly to cause the wing flap 7 to be pulled down and the rod 21 pulled forward to push up the wing flap 8. Simultaneously the rods 22 and 24 are moved to depress the ailerons 3 and 4 and the rods 23 and 25 moved to raise the ailerons 5 and 6. Hence it will be seen that the fore ailerons and wing flap are depressed and the aft ailerons and wing flap raised so that longitudinal balance of the machine is re-established.

In order to effect air braking as distinct from trimming the machine laterally or longitudinally, a separate lever 26 is provided which is pivotally mounted as at 27 to the machine structure. The lever 26 is adapted to move across a quadrant arm 28 so as to take up one of a plurality of positions, whilst fixed to said lever are two link rods 29, 30, the rod 29 being connected to one arm of a bell crank lever 31 the other arm of which is connected to a link 32 hinged to the undersurface of the fore wing flap 7, the bell crank lever 31 having mounted on its pivot point a second bell crank lever 33 to which the rod 20 on the transverse shaft 19 is connected. The second link rod 30 on the lever 26 is similarly coupled through a bell crank lever 34 and link 35 to the undersurface of the aft wing flap 8, the bell crank lever 34 having mounted thereon, similarly to the bell crank lever 31, a second bell crank lever 36 to which is connected the rod 21, the levers 33 and 36 being pivotally mounted on the machine structure.

The arrangement is such that on slight forward movement of the lever 26 the hinged wing flaps 7 and 8 are both moved upwardly to obtain maximum speed for the machine. If the lever 26 is however moved rearwardly the flaps 7 and 8 are constrained to move so as to impart greater camber to the wings to increase their lifting efficiency whilst full rearward movement of the lever 26 pulls the wing flaps 7 and 8 down to such an extent as to allow them to act as air brakes.

A modified form of control for effecting air brakes and variation of camber of the wings is shown in Figure 3.

In this arrangement it is desirable, in order to obtain a greater air braking effect and a greater variation of the lifting surfaces, to allow the ailerons and wing flaps to act as a single unit in the same direction on both wings, whilst permitting the ailerons to act independently of the wing flaps for controlling lateral balance of the machine. Accordingly the end bearings, in which the transverse shaft 19 is mounted, are so arranged as to be capable of an appreciable degree of equal rocking movement to and fro from the vertical relative to the machine structure. This is obtained by carrying the shaft 19 on arms 38 fixed to a second transverse shaft 39 free to rotate in bearings secured to the machine structure. The shaft 39 is caused to rotate through an arm 40 actuated by a lever (not shown) conveniently positioned adjacent the pilot, which may be provided with any known and suitable catch or stop device for unlocking and locking its movement relative to the machine structure; such for example as generally used in conjunction with a hand brake of a motor car. Moreover, the operation of such a hand lever or the like could also be used for effecting air braking (by any suitable intermediary mechanical movement) influencing other hinged wing flaps apart from those previously described, whilst lesser movement of the hand lever would cause alteration in wing camber and angle of incidence.

By rocking of the arm 40, the shaft 39 is caused to rotate thereby rocking the complete control column unit, i. e. the shaft 19 and sleeves 17 and 18 which correspondingly causes movement of the link rods 20, 21, 22, 23, 24, and 25 this movement raising e. g. the ailerons 3, 4 and wing flap 7 and the ailerons 5, 6 and wing flap 8 or vice versa.

It will of course be clear that instead of a fore and aft rocking movement of the control column unit as described above it is possible to arrange that the end bearings of the transverse shaft could be so designed as to be capable of an appreciable degree of equal upward and downward movement relative to the machine structure and thereby lift and lower the control column unit with a corresponding movement of the link rods which would be arranged vertically.

A further modified form of control particularly suitable for light aircraft is shown in Figure 5, in which the vertical control column 41 is fixed to a longitudinal base shaft 42 universally mounted upon a transverse lever beam 53 by means of a universal or ball hinge bolt 43 which is positioned and free to move between two bearings 44 fast with the base shaft 42. The base shaft 42 passes between fore and aft slotted guides 45, 46 respectively, said guides being secured to the machine structure. Fast with the fore end of the base shaft is a double ended control lever 47, a similar control level 48 being provided on the aft end of said base shaft 42, the said levers 47 and 48 having anchored thereto cables 49 and 50 respectively which pass over guide pulleys 51, 52 to the fore and aft ailerons 3, 4 and 5, 6, the centre lines of the hinges of which are shown in dot and pack lines.

The hinge bolt 43 passes through and is fixed to a transverse lever beam 53 which is pivotally mounted at one end in a slotted bracket 54, being retained therein by a pin 55, the bracket being carried by the machine structure. The other end of said beam 53 is bifurcated as at 56 to engage a vertical rod or tube 57 which is fixed to the machine structure and forms a positioning guide for the beam 53. The beam is caused to move up and down by manipulation of a lever 58 through a link 59, the lever 58 being hinged at one end by a pivot 60. 61 represents the lever positioning device and comprises a plate member carried by the machine structure and provided with a plurality of stop projections which are adapted to be engaged by a plate 62 carried on the undersurface of the lever 58.

The control unit functions in the following manner to effect firstly longitudinal trimming, secondly lateral trimming and thirdly air braking and cambering of the wings. The lever 41 is rocked either fore or aft about its pivot point, so that the base shaft 42 is moved up or down in the slotted guides 45, 46, carrying with it the control levers 47, 48 which through the cables 49 and 50 actuate the ailerons 3, 4, 5, and 6, e. g. to raise the fore ailerons and depress the aft ailerons or vice versa. If the lever 41 is rocked transversely, the control levers 47, 48 are likewise moved so that the fore ailerons are caused to move in directions opposite to one another and likewise the aft ailerons whereby lateral trimming of the machine is controlled.

Air braking and variation of camber is effected by movement of the lever 58 up or down with an ensuing similar movement of the beam 53. The beam 53 carries cables 63, 64 which pass over pulley wheels to the fore and aft central hinged wing flaps 7, 8 respectively whereby these latter are caused to move to increase the camber or angle of incidence, or to the full extent to effect air braking.

If desired the ailerons on both wings may extend substantially the whole width of the wing, thereby dispensing with the necessity of the central hinged wing flaps.

A modified form of control of the central hinged wing flaps 7, 8 is illustrated in Figure 6 in which it is possible to effect variation of the camber or angle of incidence, air braking and longitudinal trimming of the machine. In this modification two levers are provided a major lever 65 and a minor lever 66, the major lever being hinged at 67 and the minor lever hinged to the major at 68. A suitable catch or stop device 69 for locking each lever is provided, the major working on a quadrant 70 and the minor on a quadrant 71 on the major lever. Mounted upon the major lever are two toothed wheels 72, 73, the wheel 72 having its axis above the pivot point 67 and at the point of connection of the minor lever, the wheel 73 having its axis below the pivot point 67. The wheel 72 carries near its periphery a rod 74 which is connected through a bell crank lever 75 to the top of the aft wing flap 8 whilst the wheel 73 is connected to the undersurface of the fore wing flap 7 through a similar rod 76 and bell crank lever 77.

The operation of this modified form of control is as follows:—To effect air braking the major lever 65 is pulled extensively in the aft direction carrying with it as a unit the minor lever 66 and toothed wheels 72, 73. This movement pushes the rod 76 forward to pull down the wing flap 7 and at the same time pushes on the rod 74 to depress the aft wing flap 8 thereby effecting air braking. Lesser movement of the major lever will effect variation of camber or angle of incidence. To trim the machine longitudinally, the minor lever 66 is moved independently of the major lever 65. This movement causes the toothed wheel 72 to rotate and this wheel, meshing with the toothed wheel 73, drives this latter in the opposite direction. If, for example, the minor lever is pushed forwardly, the wheel 72 is rotated anti-clockwise (as shown by the arrow) thereby driving the wheel 73 in the clockwise direction. This rotation of the wheels 72, 73 causes the wing flap 8 to be raised and the wing flap 7 to be depressed thereby effecting longitudinal trimming of the machine. Reverse movement of the minor lever 66 still effects longitudinal trimming but in the reverse sense.

The use of the minor lever for the purpose and in the method just described, may be modified; in that the movement of such lever could effect the desired and corresponding adjustment to the hinged flap or flaps attached to the rear main plane or wings only, without simultaneously causing any corresponding opposite movement to that of those hinged to the forward main plane (or vice versa).

In effecting such a modification, it would not be necessary to employ the aforementioned plurality of intermeshing gear wheels, but the desired movement to the previously mentioned pull and push rods could be effected by the latter's hinged attachment to any suitable part of the major and minor lever respectively, and for the purpose just described.

When, in a particular design, wide centre-section wing butts constitute a part of the machine's body for the attachment of the forward and rear main planes or wings, such wide centre sections could be provided with one hinged flap to each, and thus possibly not necessitating the additional employment of others hinged either to themselves or to the wings.

For smaller types of flying machines, the pilot's strength should be sufficient to operate such levers, but for larger types power could be transmitted to such by a suitable application of any auxiliary compressed air motive power.

If it be desired, although it would be appreciated that it is unnecessary, a small tail plane may be fitted for assisting the longitudinal stability.

What I claim is:—

1. In a tandem monoplane having fore and aft wings disposed in staggered relationship and ailerons mounted at opposite ends of said wings; a control unit including a joy stick or like hand operating lever mounted for movement in a first plane and also for movement in a second plane at right angles to said first plane, and operating mechanism carried by said joy stick or like hand operating lever; means such as link mechanism connecting said operating mechanism to all the ailerons, said means being responsive to movement of the joy stick or lever in said first plane for moving the ailerons on each wing differentially and the ailerons on different wings on each side of the machine in the same sense for controlling lateral balance and being responsive to movement of the joy stick or lever in said second plane for moving the ailerons on one wing in the same sense in one direction and for moving the ailerons on the other wing in the same sense in the opposite direction for ascending or descending; and a second operating lever or the like for moving said control unit as a whole without relative movement of its component parts for effecting adjustment of all the ailerons all in the same sense whereby to effect an adjustment of the camber of the wings and hence the angles of incidence thereof, or to form an air brake.

2. In an aeroplane including fore and aft wings and ailerons movably mounted on both such wings, a main control member mounted on a pivot for movement about a horizontal axis transverse to the direction of flight of the aeroplane, mechanism connecting the main control member to the ailerons whereby pivotal movement of the control member raises the ailerons on the one wing and simultaneously lowers the ailerons on the other wing for causing the aeroplane to ascend or descend, and an independent auxiliary control member for moving the pivot of the main control member bodily to move the ailerons on the two wings simultaneously in the same direction to adjust the effective camber of the wings or cause the ailerons to act as air brakes.

3. In an aeroplane including fore and aft wings and ailerons movably mounted on both such wings, a main control member mounted on a pivot for movement about an axis approximately parallel to the direction of flight of the aeroplane and about an approximately horizontal axis at right angles to the direction of flight, mechanism connecting the main control member to the ailerons whereby pivotal movement of the control member about the axis at right angles to the direction of flight raises the ailerons on one wing and simultaneously lowers those on the other wing to cause the aeroplane to ascend or descend whereas pivotal movement of the control member about the axis parallel to the direction of flight raises the ailerons on one side of the aeroplane and lowers those on the other side for banking purposes, and an independent auxiliary control member for moving the pivot of the main control member bodily to move the ailerons on both wings simultaneously in the same direction to adjust the effective camber of the wings or cause the ailerons to act as air brakes.

4. In an aeroplane including a wing having ailerons mounted thereon, a main control member mounted on a pivot for movement about an approximately horizontal axis at right angles to the direction of flight of the aeroplane, mechanism connecting the main control member to the ailerons whereby pivotal movement of the control member in one direction or the other respectively raises or lowers the ailerons, and an independent auxiliary quick-acting control member for moving the pivot of the main control member to cause simultaneous up or down movement of the ailerons in addition to any such movement imparted thereto by the pivotal movement of the main control member.

5. In an aeroplane including a wing having ailerons mounted thereon, a main control member mounted on a pivot for movement about an approximately horizontal axis at right angles to the direction of flight and also about an axis approximately parallel to the direction of flight, mechanism connecting the main control member to the ailerons whereby pivotal movement thereof about the axis at right angles to the direction of flight moves the ailerons on each side of the aeroplane simultaneously up or down whereas movement thereof about the axis parallel to the direction of flight raises an aileron on one side of the aeroplane and lowers an aileron on the other side thereof, and an independent auxiliary control member for moving the pivot of the main control member to raise or lower the ailerons on both sides of the aeroplane simultaneously.

6. An aircraft in which there are provided two main supporting surfaces constituting wings disposed in staggered relationship fore and aft of the normal center of gravity, ailerons on said wings, a central hinged wing flap between the ailerons on each wing and control means for the ailerons and the wing flaps comprising a control member and mechanism connecting the control member to the ailerons and wing flaps whereby movement of the control member in one sense causes the ailerons and wing flaps to move so as to control longitudinal balance of the aircraft while movement of the control member in another sense causes movement of the ailerons to control lateral balance of the aircraft.

7. An aircraft in which there are provided two main supporting surfaces constituting wings disposed fore and aft of the normal center of gravity, ailerons on the said wings, a central hinged wing flap between the ailerons on each wing and control means for the ailerons and wing flaps comprising a vertical control column, a control wheel rotatably mounted on the control column, mechanism connecting the control wheel and control column to the ailerons and the control column to the wing flaps whereby rotation of the control wheel actuates the ailerons to control lateral balance of the aircraft while movement of the control column actuates the ailerons and wing flaps to control longitudinal balance of the aircraft.

8. An aircraft including fore and aft wings and ailerons movably mounted on both such wings, actuating means for the ailerons on both fore and aft wings comprising a main control lever and base shaft, an auxiliary control lever on which the main control lever and base shaft are universally mounted, means for preventing twisting of the base shaft about the longitudinal axis of the lever, two double-ended levers connected one to each end of the base shaft, connections between the ends of the double-ended levers and the ailerons whereby movement of the control lever in the fore and aft direction to raise the ailerons on one wing and lower those on the other wing simultaneously, while sideways movement of the control lever raises the ailerons on one side of the aircraft and simultaneously lowers those on the other side thereof, and independent means for moving the auxiliary control lever to move the main control lever and base shaft bodily to cause the ailerons on both wings to be raised or lowered simultaneously to vary the effective camber of the wings or to effect air braking.

9. An aircraft as claimed in claim 8 in which the base shaft extends fore and aft and the double-ended lever on the forward end is connected to the ailerons on the fore wing while that on the after end is connected to the ailerons on the after wing, the auxiliary control lever comprising a transverse beam pivotally connected at one end to the aircraft structure and carrying the base shaft and means for pivotally moving said beam up and down to move the base shaft up and down.

10. An aircraft as claimed in claim 7, in which the said control means for the ailerons and wing flaps comprises a vertical control column, a control wheel rotatably mounted on the control column, a vertical shaft extending along and rotatable relatively to the control column, gearing connecting the control wheel to the upper end of the shaft, a transverse shaft to which the lower end of the control column is connected, two hollow sleeves rotatably mounted coaxially with the transverse shaft, gearing connecting the lower end of the vertical shaft to the two sleeves, connections between each of said sleeves and the fore and aft ailerons on one side of the aeroplane, supports for the transverse shaft, mechanism connecting the transverse shaft to the wing flaps, and independent control mechanism for moving the supports and hence the transverse shaft and sleeves in a direction at right angles to the length of the transverse shaft, the arrangement being such that rotation of the hand wheel transmits movement to the sleeves to operate the ailerons to control lateral balance, movement of the control column about the axis of the transverse shaft actuates the ailerons to control longitudinal balance and movement of the independent control mechanism moves the transverse shaft and sleeves bodily to cause movement of the wing flaps and ailerons to vary the effective camber of the wings or to act as air brakes.

11. An aeroplane as claimed in claim 2, in which the control mechanism for the ailerons comprises a vertical control column, a control wheel rotatably mounted on the control column, a vertical shaft extending along and rotatable relatively to the control column, gearing connecting the control wheel to the upper end of the vertical shaft, a transverse shaft to which the lower end of the control column is connected, two hollow sleeves rotatably mounted coaxially with the transverse shaft, gearing connecting the sleeves to the lower end of the vertical shaft, connections between each sleeve and the fore and aft ailerons on one side of the aeroplane, supports for the transverse shaft, and independent control mechanism for moving the supports and hence the transverse shaft and sleeves in a direction at right angles to the length of the transverse shaft, the arrangement being such that rotation of the hand wheel transmits movement to the sleeves to operate the ailerons to control lateral balance, movement of the control column about the axis of the transverse shaft actuates the ailerons to control longitudinal balance, and movement of the independent control mechanism moves the transverse shaft and sleeves bodily to cause movement of the ailerons to vary the effective camber of the wings or act as air brakes.

12. An aircraft as claimed in claim 2, in which the control mechanism for the ailerons comprises a vertical control column mounted on a pivot having its axis transverse to the direction of flight, a control wheel rotatably mounted on the control column, mechanism connecting the control wheel and the control column to the fore and aft ailerons whereby rotation of the control wheel causes movement of the ailerons to effect lateral balance while pivotal movement of the control column causes movement of the ailerons to effect longitudinal balance, supports for the pivot of the control column, and auxiliary control mechanism for moving the said supports to effect bodily movement of the control column whereby movement of the ailerons is caused to vary the effective camber of the wings or to effect air braking.

13. An aircraft as claimed in claim 2, in which the control mechanism for the ailerons comprises a vertical control column mounted on a pivot having its axis transverse to the direction of flight, a control wheel rotatably mounted on the control column, mechanism connecting the control wheel and the control column to the fore and aft ailerons whereby rotation of the control wheel causes movement of the ailerons to effect lateral balance while pivotal movement of the control column causes movement of the ailerons to effect longitudinal balance, supports for the pivot of the control column, and auxiliary control mechanism comprising a quick acting hand lever for moving the said supports to effect bodily movement of the control column whereby movement of the ailerons is caused to vary the effective camber of the wings or to effect air braking.

WILLIAM EDWARD BACK.